United States Patent [19]

Wingard, Jr. et al.

[11] 4,375,357
[45] Mar. 1, 1983

[54] WATER-SOLUBLE FAST POLYMERIC BLACK COLORANT, ITS PREPARATION AND USE IN DYES AND INKS

[75] Inventors: Robert E. Wingard, Jr., Mountain View; Steve Y. W. Ng, San Francisco; Sally A. Swanson, San Jose, all of Calif.

[73] Assignee: Dynapol, Palo Alto, Calif.

[21] Appl. No.: 271,913

[22] Filed: Jun. 9, 1981

[51] Int. Cl.$^3$ .............................................. C09B 69/10
[52] U.S. Cl. ........................................... 8/647; 8/919; 525/351; 525/353; 528/424; 525/333.4; 525/333.6
[58] Field of Search ...................... 8/647; 525/334, 336, 525/351, 353; 528/424

[56] References Cited

U.S. PATENT DOCUMENTS

| | | | |
|---|---|---|---|
| Re. 30,362 | 8/1980 | Sless et al. | 8/647 |
| 3,484,390 | 12/1979 | Bauman et al. | 260/2.2 |
| 4,000,118 | 12/1976 | Dawson et al. | 260/79.5 C |
| 4,018,826 | 4/1977 | Sless et al. | 8/647 |
| 4,051,138 | 9/1977 | Wans et al. | 260/278 |
| 4,096,134 | 6/1978 | Otteson et al. | 260/79.5 R |
| 4,144,252 | 3/1979 | Wans et al. | 260/371 |
| 4,190,716 | 2/1980 | Parkinson et al. | 525/334 |

*Primary Examiner*—A. Lionel Clingman
*Attorney, Agent, or Firm*—Burns, Doane, Swecker & Mathis

[57] ABSTRACT

A family of polymeric black colorants is disclosed. The subject colorants are composed of an organic polymer backbone comprised of a plurality of aromatic rings from which depend via azo groups a plurality of chromophore units having the structure

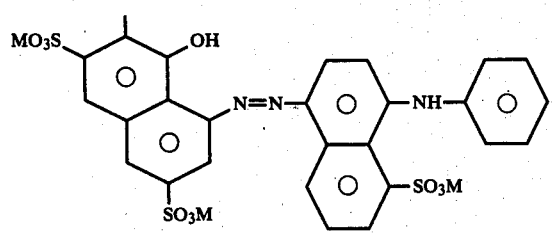

wherein M is hydrogen or preferably a cation. These polymeric colorants are water-soluble, and noncrystalline and form dyes and inks that are fast to paper stock.

17 Claims, No Drawings

WATER-SOLUBLE FAST POLYMERIC BLACK COLORANT, ITS PREPARATION AND USE IN DYES AND INKS

BACKGROUND OF THE INVENTION

1. Field of the Invention

This invention relates to polymeric colorants, particularly water-soluble polymeric black colorants useful as water-based printing ink components.

2. The Prior Art

An ideal black dye exhibits a strong absorbance throughout the visible color range. There are two basic ways to achieve this. The first is to intentionally or inadvertently combine a number of colors which separately absorb various portions of the color range. Nigrosine, a widely accepted black dye, is such a mixture. This method has an advantage that color shading is simply accomplished by varying the mixture's composition and the disadvantage of separating into its components under certain conditions.

The second type of black dye employs a single chromophore having a very broad absorbance. This is easily done with insoluble "carbon black" type materials but far more difficult to attain with soluble systems. The present invention relates to such a "single dye" soluble system.

The colorant of this invention is a polymeric colorant. Polymeric colors are known to offer advantages in use of noncorrosivity (U.S. Pat. No. 3,976,797, issued Aug. 24, 1976) and nonmigration in substrates (U.S. Pat. No. 3,937,851, issued Feb. 10, 1976). In addition, they can be made water-soluble—an advantage today with increasing opposition to widespread use of organic solvented dye systems which release organic solvents into the workplace.

We and our coworkers have prepared and reported a number of polymeric colors heretofore. For example, U.S. Pat. No. 3,920,855, issued Nov. 18, 1975 discloses a family of nonabsorbable polymeric food colors. These materials employ known chromophores. U.S. Pat. No. 4,018,826, issued Apr. 19, 1977 discloses poly(vinylamine) as a colorant backbone and shows a range of polymeric colorants. U.S. Pat. Nos. 4,051,138, issued Sept. 27, 1977; 4,096,134, issued June 20, 1978; 4,182,885, issued Jan. 8, 1980; and 4,233,328, issued Nov. 11, 1980 are representative of other patents dealing with polymeric colorants. These references have either achieved polymeric forms of colors having hues that match those of their known monomeric equivalents or have employed newly discovered chromophore units. In contrast, the present colors employ a known chromophore unit (Acid Blue 92), but modify and couple it in a way that changes its color from a monomeric blue to a polymeric black.

STATEMENT OF THE INVENTION

We have now discovered a polymeric black colorant that is a deep rich black, is water-soluble and, like many soluble polymers is noncrystalline. Our colorant has a structure

[Structure diagram shown]

wherein

[Structure diagram shown]

is an aromatic ring present in an organic polymeric backbone, M is a cation and n is an integer greater than one.

In another aspect, this invention relates to the preparation of such a colorant by the coupling of Acid Blue 92 to diazotized aromatic amine-containing polymer.

In further aspects, this invention relates to inks and dyes containing these colorants in solution and the use of these colorants as inks fast to paper.

DETAILED DESCRIPTION OF THE INVENTION

Definitions

In the present description and claims, reference will be made to several terms which are expressly defined as follows:

The term "Chrom" as used in the Formulae shall be a short hand notation for the chemical group having the structure

[Structure diagram shown]

The term "water soluble" shall mean the property of being soluble in water to an extent of at least 1000 ppm by weight.

The terms "organic polymeric backbone" and the like shall mean a synthetic compound comprising repeating units linked together by carbon-carbon or carbon-oxygen covalent bonds.

The term "average molecular weight" shall designate a mean molecular weight as determined by gel permeation chromatography comparison with known standard molecular weight polymers.

The term "recurring" is used to describe repeating units in a polymer chain. As so used, the term is intended to encompass not only the situation wherein a single unit repeats in a "homopolymer" structure, but also the situation wherein a unit appears in a polymer chain interspersed with other different units in a "copolymer" structure.

Structure of the Polymeric Colorants

The colorants of this invention are polymeric in nature and comprise 8-(4-anilino-5-sulfo-1-naphthylazo)-1-naphthol-3,6-disulfonic acid groups (or salts thereof) bonded through their "2-carbon" position via azo links to aromatic carbons present in aromatic organic polymer backbones. Pictorially, such materials may be represented as shown in General Structural Formula I,

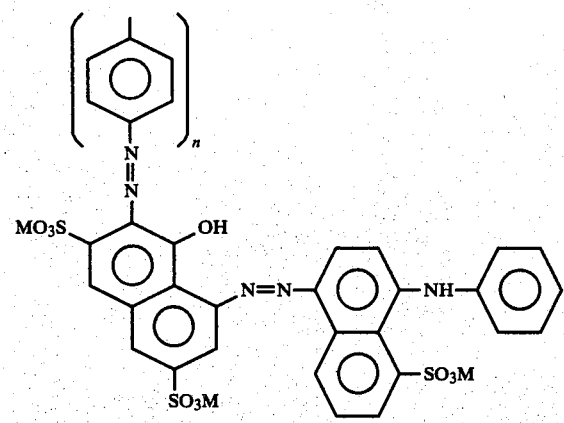

(I)

wherein M is hydrogen or a cation selected from among the monovalent metal cations such as the metal cations found in period 3, group I, and period 4, group I, of the Periodic Table of the Elements. Preferably, M is hydrogen, or cations of Na or K so that the group is present as a acid group or as a sodium or potassium salt. Most preferably, M is sodium such that the group is a trisodium salt.

In pictorial representation I.,

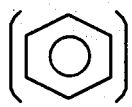

represents a portion of an aromatic-group-containing organic backbone from an aromatic carbon-atom of which extends an azo link and therefrom the chromophoric group. "n" is an integer that is greater than 1.

The Polymeric Backbones

The aromatic-group-containing polymer backbone may take either of two structures. In one, the aromatic groups are present as groups pendant from an organic chain which links them together into the desired polymer backbone. Such a structure has n recurring

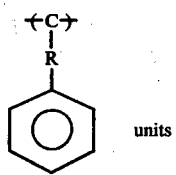

units wherein C is a portion of a covalent organic polymer chain linking the units together, n is an integer greater than 1 and R is a carbon to carbon single linking group. Examples of such linking groups include amine links, sulfonamide links, ether links, ester links, amide links, carbamate links, alkyl links, and the like. Preferred as R are carbon-carbon single bonds and sulfonamide links.

The polymer backbones employed themselves are stable under the conditions of use and do not break down under these conditions.

The second backbone aromatic group configuration which can be employed in the present polymeric compounds has the aromatic groups as an integral part of the backbone; such a structure has recurring arylene units, i.e.,

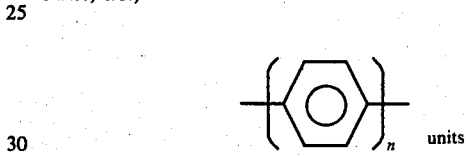

units

The azo links are attached to carbons of these arylene units. The backbones in either of these two configurations can be linear, or branched so long as they present the requisite aromatic carbon groups required to affix the azo bonds in the final product. Preferably, they are substantially linear. A number of examples of suitable polymeric backbones and an outline of the method of their use are given in a series of preferred embodiments. These are merely representative and are not to be construed as limiting the scope of the backbones useful in the practice of this invention. It is considered that the present invention involves polymeric forms of this chromophore, generally and is not limited to a particular backbone. Accordingly, other art-known backbones which would provide the desired aromatic backbone carbons could be employed as well as the materials herein specifically embodied.

EMBODIMENT 1.
Backbone: Polystyrene
Preparation:

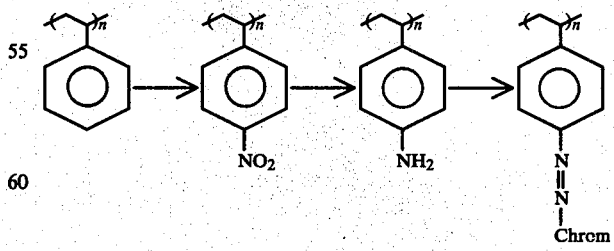

In this and all the other embodiments, only one polymer repeat unit is shown. This is done for simplicity. It will be appreciated that the several reactions may not be completely quantitative in yield. Accordingly, while the final product will have the unit shown as a recurring unit, it may also have minor amounts of other unreacted precursor units. In this embodiment, for example, the product might be expected to have four different units in an overall structure.

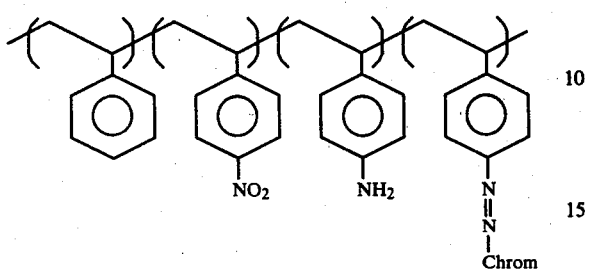

It will be further appreciated that, since the Chrom-containing units are the only colored units, it is generally desired to maximize the proportion of this unit and minimize the residual precursor units. Preferably, the Chrom-containing units make up at least 25% (more preferably from 50 to 100%) of the maximum number theoretically possible. (In other words, preferably at least 1 out of 4 backbone aromatic units carry an azo-linked chrom group.)

In practice, it may be of importance to assay for the presence of Chrom units as well as for the presence of other units present in the polymer. Conventional analytical techniques known to the art will serve for these determinations. Representative analytical methods include the following:

Azo Bond Content is determined by reductive titration with chromous ion.

Aromatic Amine (on precursor polymer) is determined by redox titration with $NaNO_2$.

Aromatic Amide is determined by proton NMR using the methyl group proton signal for quantitation.

Aliphatic Amine is determined by a modified van Slyke method in which primary aliphatic amine is converted to $N_2$ gas. Measured volume of evolved $N_2$ is used to quantitate original amount of polymeric primary aliphatic amine.

EMBODIMENT 2.

Backbone: Poly(vinylamine)*-Based Polysulfanilamide.
Preparation:

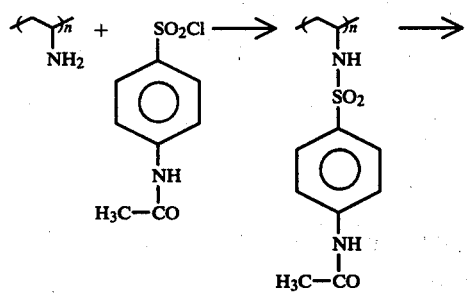

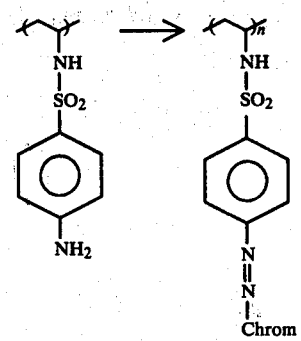

*Prepared such as by the method of U.S. Pat. No. 4,018,826.

EMBODIMENTS 3, 4 AND 5.

Backbone:

The same as in Embodiment 2 except that the following units are copolymerized with the vinylamine units: acrylic acid, vinyl sulfate, ethylene.

Embodiment 3

Acrylic acid (1–50 mole% basis number of total vinyl units). Such backbone materials and their preparation are shown in U.S. Pat. No. 3,920,855.

Embodiment 4

Vinyl sulfonate (1–50 mole% basis number of total vinyl units). Such copolymers and their preparation are shown in U.S. Pat. No. 4,096,134.

Embodiment 5

Ethylene (1–50 mole% basis number of total vinyl units). Such copolymers and their preparation are shown in U.S. Pat. application Ser. No. 110,071 filed Jan. 7, 1980.

EMBODIMENT 6.

Backbones:
Poly(ethyleneimine)-Based Polysulfanilamide.
Preparation:

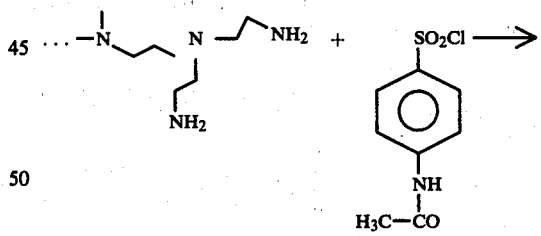

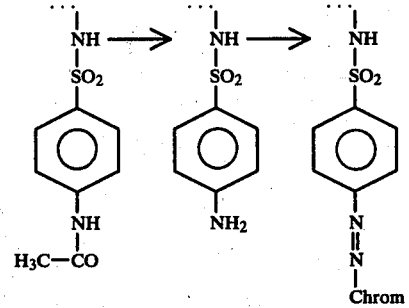

EMBODIMENTS 7, 8, 9, 10 AND 11.

Backbone:

Polyvinylamine, its copolymers, shown in Embodiments 3, 4 and 5, and poly(ethyleneimine) following reaction with

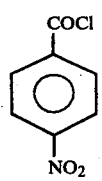

Representative Preparation:

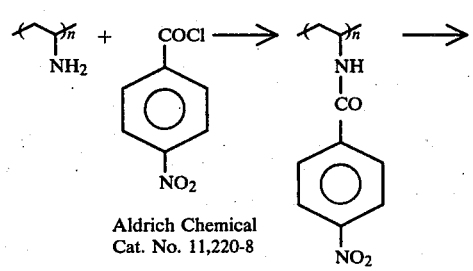

Aldrich Chemical Cat. No. 11,220-8

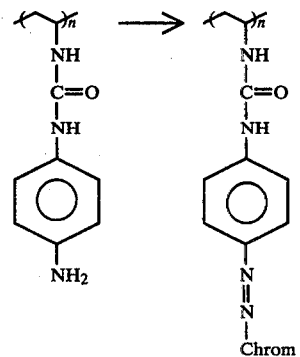

EMBODIMENTS 17, 18, 19, 20 AND 21.

Backbone:

Polyvinylamine, its copolymers shown in Embodiments 3, 4 and 5, and Poly(ethyleneimine) following reaction with

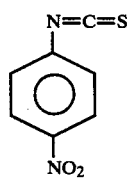

Representative Preparation:

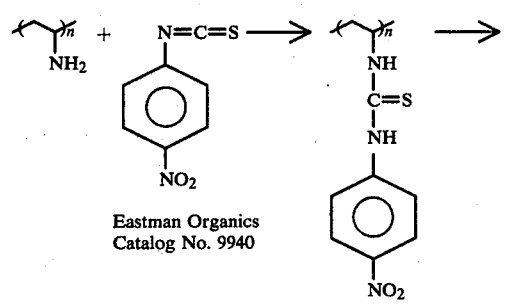

Eastman Organics Catalog No. 9940

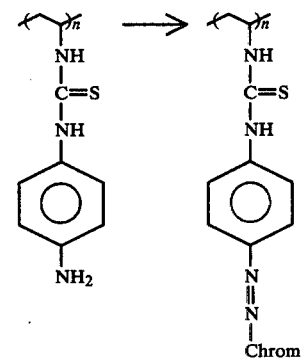

EMBODIMENTS 12, 13, 14, 15 AND 16.

Backbone:

Poly(vinylamine), its copolymers shown in Embodiments 3, 4 and 5, and poly(ethyleneimine) following reaction with

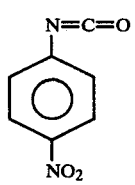

Representative preparation:

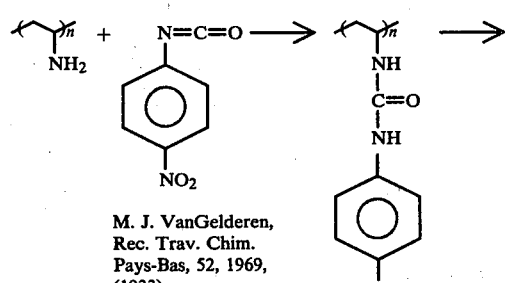

M. J. VanGelderen, Rec. Trav. Chim. Pays-Bas, 52, 1969, (1933).

EMBODIMENT 22.

Backbone:

Poly(N-methylvinylamine) following reaction with

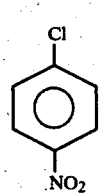

Preparation:

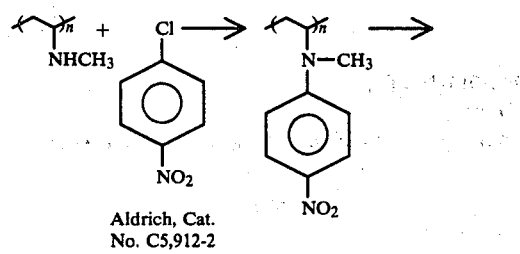

Aldrich, Cat.
No. C5,912-2

EMBODIMENT 23.
Backbone:
Copolymer of N-methylvinylamine, with from 1-50 mole % (basis total vinyl units) of ethylene, vinylsulfonate or acrylic acid.

EMBODIMENT 24.
Backbone:
Poly(vinyl alcohol) following reaction with

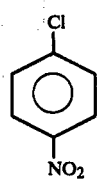

Preparation:

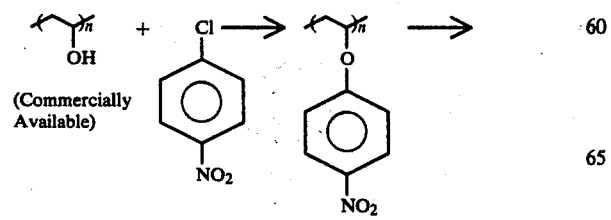

(Commercially Available)

-continued

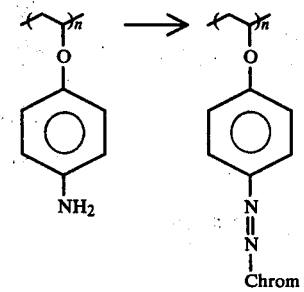

This same embodiment can also employ a copolymer of vinyl alcohol.

EMBODIMENT 25.
Backbone:
Poly(vinyl alcohol) (or copolymers of vinyl alcohol) following reaction with

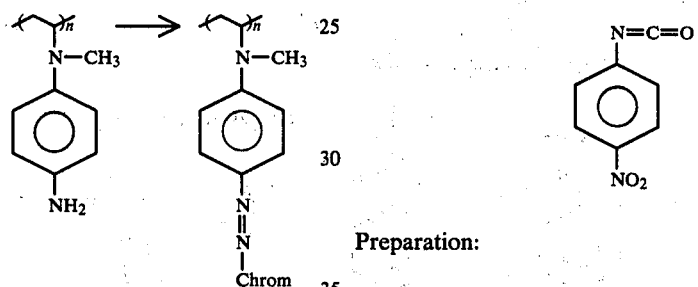

Preparation:

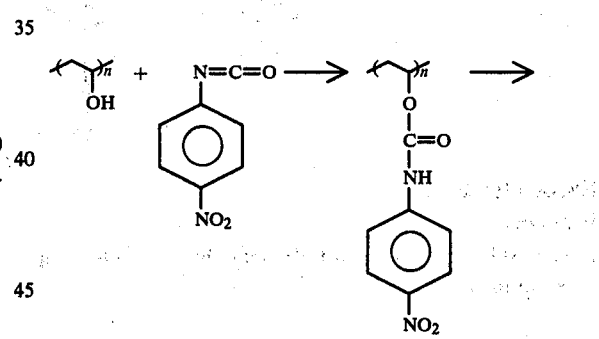

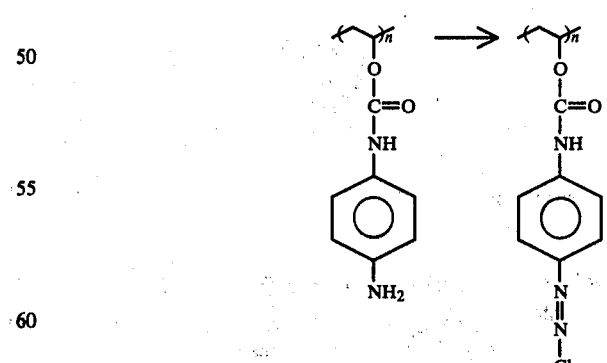

EMBODIMENT 26.
Backbone:
Poly(vinyl alcohol) or copolymers of vinyl alcohol following reaction with

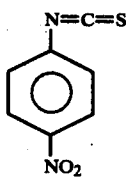
Preparation:
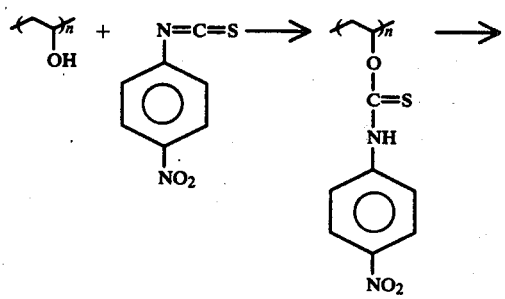
EMBODIMENT 27.
Backbone:
Poly(vinyl alcohol) or copolymers thereof following reaction with
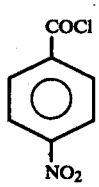
Preparation:
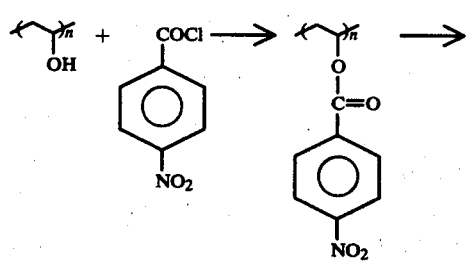
-continued
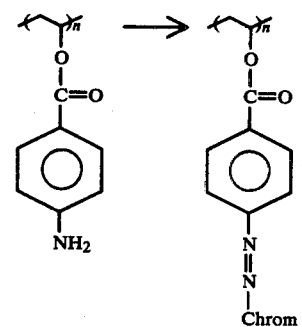
EMBODIMENT 28.
Backbone:
Poly(acryloyl chloride) following reaction with
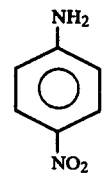
Preparation:
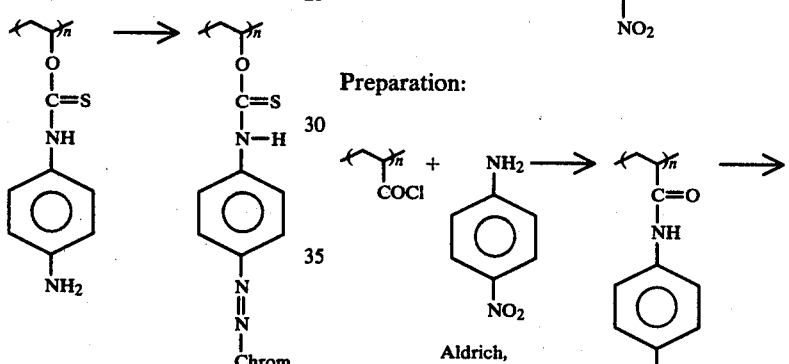
Aldrich, Cat. No. N985-3
EMBODIMENT 29.
Backbone:
Poly(acryloyl chloride) following reaction with
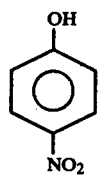
Preparation:

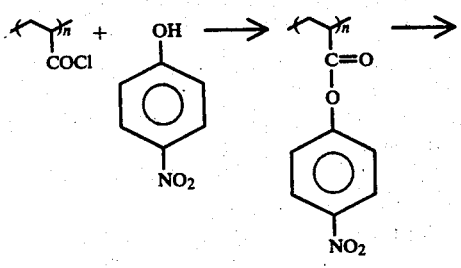

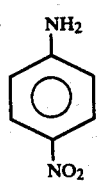

EMBODIMENT 30.
Backbone:
Poly(vinylisocyanate) following reaction with

Preparation:

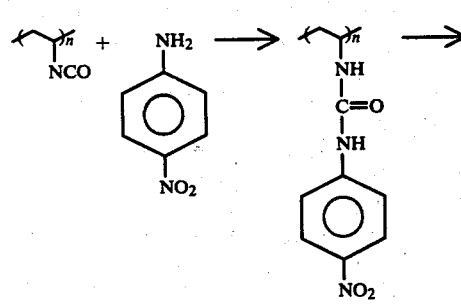

C. G. Overberger and C. J. Podsiadly, Macromol. Synth., Coll. Vol. I, John Wiley, N.Y., pp 473–476.

EMBODIMENT 31.
Backbone:
Poly(vinylisocyanate) following reaction with

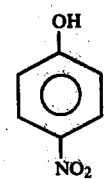

Preparation:
This would be the same as the preparation shown in Embodiment 29 substituting poly(vinylisocyanate) as a starting material. The intermediate product would be

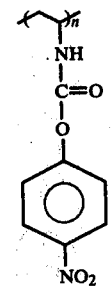

EMBODIMENT 32.
Backbone:
Poly(epichlorohydrin) following reaction with p-nitrophenol.
Preparation:

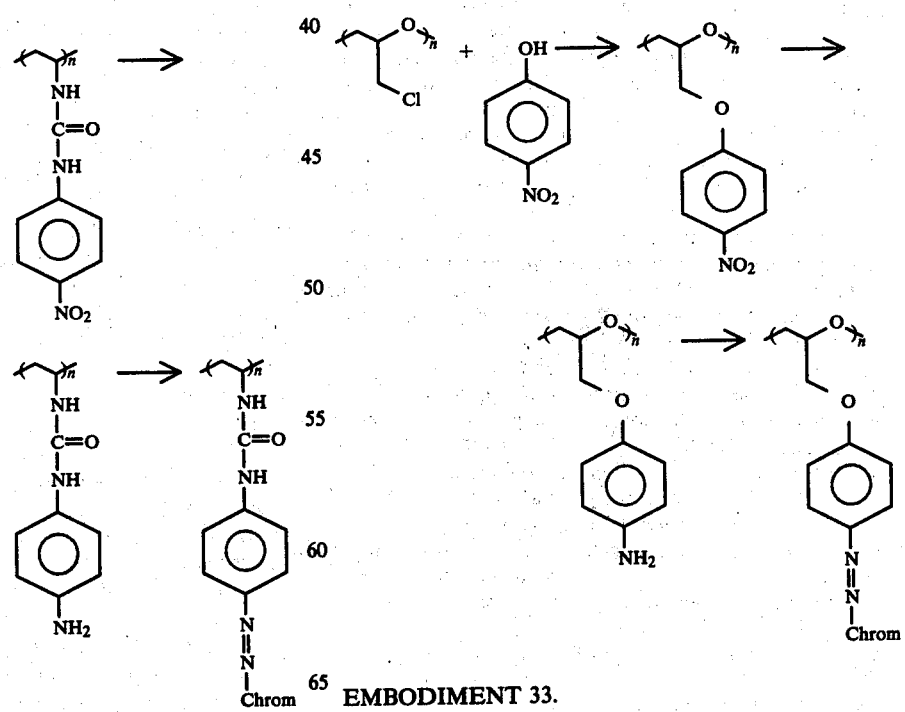

EMBODIMENT 33.
Backbone:
Poly(epichlorohydrin) following reaction with

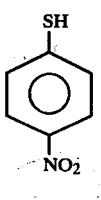

Preparation:

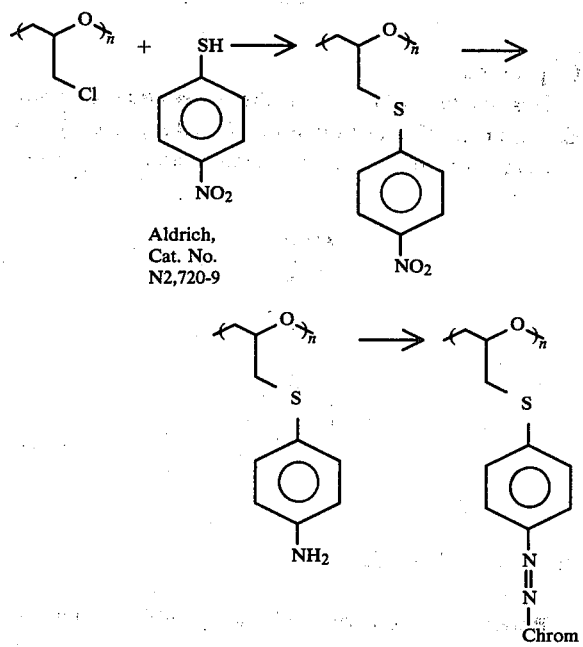

Aldrich,
Cat. No.
N2,720-9

Preferred Backbones

Some classes of backbones are preferred because of their ease of use in synthesis. For example, water-soluble backbones are generally easier to use, diazotize and couple than are water-insoluble backbones. Backbones based on alkylamine-group-containing polymers, especially those shown in Embodiment 2 through 6 are preferred. These materials are available and artknown, or based on available art-known precursors.

Generally, the backbone should have an average molecular weight of at least 1000 daltons with an average weight of from about 2000 to about 2,000,000 daltons being preferred and average molecular weights of from about 3,000 to about 1,000,000 daltons being more preferred and average molecular weights of from 5,000 to 500,000 being most preferred.

These desired molecular weights also give rise to preferred value for n, the integer defining the number of units of Chrom on the polymer. As previously noted, n is at least 1. Preferably, n is from 5 to 20,000, with values of from 10 to 10,000 being more preferred.

The degree of substitution, that is the fraction of backbone aromatic rings that are substituted with azo-linked chromophore groups can vary. No advantage is seen in very low substitution as it means that exaggerated amounts of backbone need be consumed. Substitutions of from about 25 to 100% are generally preferred with a more preferred range of substitution being about 50 to about 100%.

Preparative Methods

In the illustrative embodiments, a variety of preparative methods are briefly set forth. The examples describe several methods in detail. In this section a general expansion of the methods of the illustrative embodiment is provided.

A. In Embodiment 1 and in many later embodiments, an azo group is introduced by (1) nitrating an aromatic ring, (2) reducing the resulting aromatic nitro group to an amine. In all embodiments diazotizing and coupling are shown. The nitration of aromatic rings may typically be carried out by standard methods such as those found in C. A. Buehler and D. E. Pearson, Survey of Organic Syntheses, Vol. I, Wiley-Interscience, New York, New York, 1970, pp 980–991. Preferred methods include the use of (1) $KNO_3$ in 96% $H_2SO_4$, (2) mixed acid ($HNO_3$—$H_2SO_4$), and (3) red fuming nitric acid.

The reduction of these nitro groups to amines may be conducted using standard procedures such as those found in C. A. Buehler and D. C. Pearson, Survey of Organic Syntheses, Vol. I, Wiley-Interscience, New York, New York, 1970, pp 413–417. Preferred methods include (1) treatment with $Na_2S$, (2) treatment with sodium dithionite ($Na_2S_2O_4$), (3) treatment with metal (e.g., Fe, Sn, or Zn) and acid, (4) catalytic reduction (e.g., 5% Pd on C and $H_2$), and (5) treatment with phenylhydrazine, with sodium dithionite reduction being generally preferred.

The diazotization of the aromatic amine groups is carried out on an acidic solution or suspension of the polymers. The solution or suspension is contacted with a slight excess of a nitrite, such as sodium nitrite, potassium nitrite or the like at low temperatures (0° C. to about 35° C.). The diazotization is generally very quick, requiring only a minute or two so that reaction times of from 0.1 minute to about 2 hours may be used. If a relatively water-insoluble polymer is to be diazotized, this may be carried out in nonaqueous media. In such a reaction nitrosyl chloride, nitrosyl bromide, alkyl nitrite esters or nitrosyl sulfonic acid or the like may be used in standard organic solvents such as lower alcohols or chlorinated hydrocarbons. This would be carried out at low temperatures.

The coupling of the Chrom group is effected promptly after the amines are diazotized. The solution or suspension of diazotized polymer is mixed with a solution of Acid Blue 92 at low temperature (0° C. to about 45° C., preferably 10° C. to 35° C.). An excess of Acid Blue 92 is generally employed. The pH is maintained basic, such as above about pH 10, preferably pH 12.0–13.5 by addition of base, such as KOH or NaOH. The mixing may be done stepwise. The time required for coupling is from about 0.25 hour to about 5 hours with times of 0.5 to 1.0 hours generally giving good results.

B. It has been pointed out that the group may be present as a free acid or as a salt. If the acid is desired, the coupling product is acidified with a strong acid such as hydrochloric acid or the like. If a salt is desired as is preferred, acidification need not be carried out.

C. In preferred embodiments 2-6, an alkylamine is converted into a sulfonamide group as the required pendant aromatic ring is introduced. This step is well effected by a "Schotten-Baumann" type reaction wherein the alkyl amine is contacted with an aromatic compound containing an amine precursor functionality and a sulfonyl chloride functionality

at relatively low temperatures (40° C. or less) and a pH of about 9-10. A typical reaction employs an aqueous reaction solvent, preferably also containing some water-miscible polar organic solvent such as tetrahydrofuran, dioxane, dimethoxyethane, diglyme, isopropanol, t-butanol or 2-methoxyethanol and vigorous agitation.

Suitable aromatic compounds for use herein are N-acetylsulfanilyl chloride,

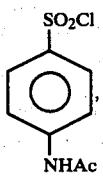

and the like.

The concentration of polyamine in the solution should be maintained at from about 1% to about 20%. As a rule, the aromatic compound should be added gradually over a period of at least about 0.25 hours. During this addition, the pH should be monitored and maintained between about pH 9 and 10. After the addition is completed, the pH may suitably be raised somewhat, such as to 10-11, and the mixture stirred for an additional 0.5 to 4 hours. The reaction which occurs is as follows in the case where N-acetylsulfanilyl chloride is employed:

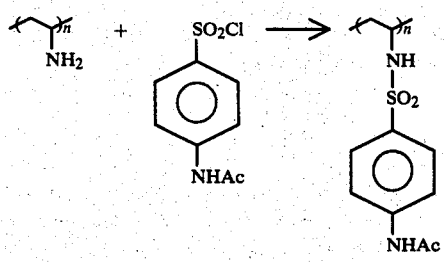

The product of this reaction may be isolated by stripping off the organic solvent and filtering. It is then contacted with acid (generally a substantial excess of aqueous mineral acid solution such as from 3-10 equivalents of acid per equivalent of acetyl groups) to deacetylate it. The deacetylation proceeds at a moderate rate, requiring 2-6 hours at temperatures of 80°-100° C. Higher or lower temperatures (200° C. or 50° C.) could be used if desired with accompanying changes in reaction time. This deacetylation produces the polymer

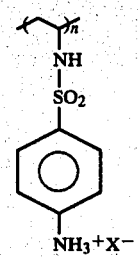

wherein $X^-$ is the anion corresponding to the mineral acid employed.

D. In Embodiments 7-11, the condensation of a polymeric amine with

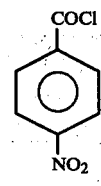

is shown. This reaction may be carried out by contacting the polyamine with an excess of the acid chloride in aqueous media of alkaline pH at moderate temperatures (roughly 0°-35° C.) for 0.5-3 hours.

E. In Embodiments 12-21 and 25 and 26, coupling reactions with

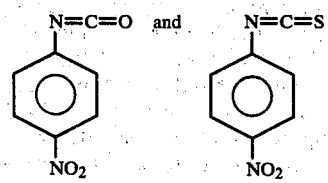

are shown. The polyamine couplings may be conducted with an excess of the isocyanate or the isothiocyanate in aqueous media at moderate temperatures (about 0°-35° C.) for 0.5-3.0 hours. The coupling reactions with polyvinyl alcohol are best conducted neat or in an inert solvent (e.g., dimethyl sulfoxide or hexamethylphosphoramide). These reactions also require higher temperatures and longer contact times.

Use of the Polymers

The polymers of this invention have the property of having a deep black color. As such they find use as color components of dyes and inks.

In this use in dyes and inks, the polymers of this invention are formulated with a suitable solvent to yield a dye solution or ink. Solvents for this use are aqueous solvent systems, that is a solvent containing at least 50% by weight water. They may, as well, contain a variety of art-known other materials to aid the ink's pentration or adhesion to paper or other cellulosic webs in use. Such other materials include water-soluble organics having some oleophillic character such as $C_4$-$C_8$ alkanols and glycol ethers and the like; for example n-butanol, n-pentanol, n-hexanol, the ethyl, propyl and butyl monoethers of ethylene glycol, the ethyl, propyl and butyl ethers of diethyleneglycol and the like. It is preferable to minimize the amount of organics added to the solution as the essential absence of volatile organics is an advantage of the present dye systems. Preferably, the dye system is a water base containing 1000 ppm to 20% (by weight) of polymeric dye and up to 40% (by weight) of water-soluble organics. More preferably it contains from 2000 ppm to 15% dye and 2% to 20% water-soluble organics.

Two or more species of the present polymeric black colorants can be used in combination if desired as can combinations of these polymeric colorants with other monomeric, or preferably, polymeric colorants. Thus an ink or dye may contain the present polymeric black colorants in solution with art-taught monomeric colors or with polymeric colors as are disclosed in U.S. Pat. Nos. 3,920,855; 4,051,138; 4,096,134; 4,182,885, or 4,233,328 or the like. These patents are incorporated herein by reference. Addition of other polymeric colorants to tint or shade the color offers the advantage that the resulting mixture can have, to a large extent, uniform polymeric colorant physical and/or chemical properties. The amounts of these "other" dyes can vary as required to obtain the shade or tint desired.

Such dyes are formulated by simple admixing techniques known in the art. They may be applied to cellulosic stock, particularly paper, by letter press, lithographic, electrophotographic, screen or spray processes or off-set techniques all as known to the art.

Purification of the Colorant

Following their synthesis, it may be desired to purify the colors such as to remove unreacted feeds, side products or other nonpolymeric contaminants. This may be easily effected by filtration, centrifugation, dialysis and like processes but preferably is carried out by means of ultrafiltration, a process offering advantages of speed and efficiency. Ultrafiltration of polymeric dyes is fully described in U.S. Pat. Nos. 4,189,380 and 4,225,432 both of which are incorporated herein by reference.

The invention will be further described by the following examples. They are intended solely to exemplify the invention and are not to be construed as limiting its scope.

EXAMPLE I

Reaction Scheme:

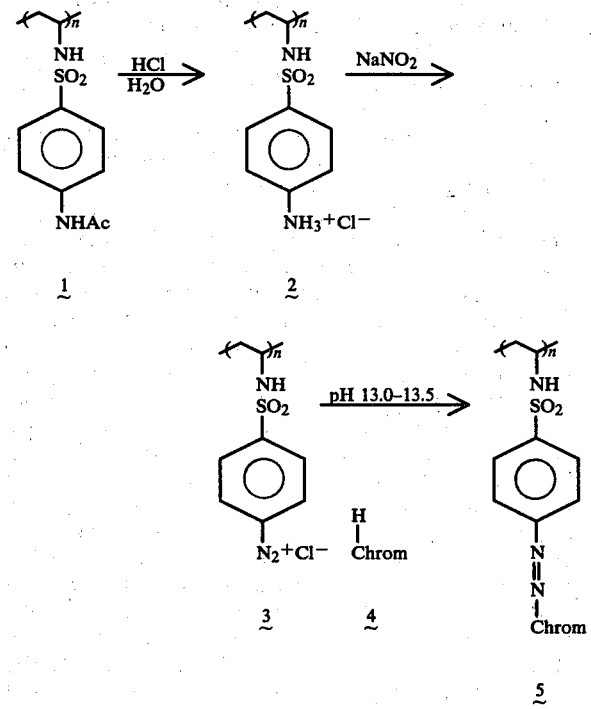

PRECURSOR PREPARATION:

Precursor polymer 1 was prepared using the procedure of Gless et al., U.S. Pat. No. 4,018,826 and JACS 98:19 Page 5996 (Sept. 15, 1976). In a typical preparation a 2-l., three-neck flask, equipped with an overhead stirrer, thermometer, and dryice condenser, was charged with 532 g (9.0 mol) of technical acetamide. With stirring, 12.4 ml of 6 M $H_2SO_4$ and 134 g (3.0 mol) of acetaldehyde were added sequentially and the reaction vessel was heated with a 100° C. oil bath. After the reaction had stirred for 10 minutes, the internal temperature ($T_i$) was 75° C. and the mixture was homogeneous. The condenser was removed as an exotherm began, which raised $T_i$ to 100° C. within 2 minutes. Ethylidene bisacetamide crystallized rapidly from the mixture, causing a further increase in $T_i$ to 108° C. After 7 minutes at or above 100° C., the heating bath was turned off and 60 g (0.60 mol) of $CaCO_3$ (precipitated chalk) was carefully added, followed by 30 g of Celite 503.

The reaction vessel was fitted with a wide-bore, vaccum-distillation apparatus equipped with a Vigreux column and the pressure was slowly decreased to 30–40 mm of Hg. The bath was heated to 200° C. and the mixture was distilled to dryness (~4 h).

The crude distillate was melted, diluted with 250 ml of isopropyl alcohol, and cooled to 5° C. for 18 hours. Filtration afforded 125 g of acetamide and a filtrate which was 38.7 wt. % N-vinylacetamide by bromine titration. This solution was subjected to polymerization without further purification.

A 5-l., four-neck flask, equipped with an overhead stirrer, thermometer, reflux condenser, Ar inlet, and heating mantle, was charged with 1165 g of an N-vinylacetamide solution (451 g, 5.30 mole) prepared as described in the preceding step. After isopropyl alcohol addition (1.3 l.), the reaction mixture was thoroughly deoxygenated and heated to a vigorous reflux under Ar. A solution of 22.3 g (0.14 mol) of AIBN in 83 ml of acetone was added in one portion and the reaction was refluxed for three hours.

After cooling, most of the solvent was removed in vacuo and the resulting thick orange oil was precipitated by slow addition to 10 l. of rapidly stirred acetone. The solid was filtered, washed with acetone (3×2 l.), and dried in vacuo at 50° C. to afford 431 g (96%) of poly(N-vinylacetamide) as a white powder.

A 5-l., four-neck flask equipped with overhead stirrer, thermometer, distillation head, and heating mantle, was charged with 1 l. of $H_2O$ and stirring was begun. The $H_2O$ was boiled, as 1412 g of an acetone-wet filter cake of polymer (424 g, 4.98 mol as determined by drying a sample, $M_p{}^{ps}\times 10^4$) was added along with 200 ml of $H_2O$. After the acetone had been removed by distillation, the mixture was cooled and treated with 522 ml of 12 N HCl (6.26 mol). Reflux was resumed under Ar. At 40 h, the cloudy solution was treated with 100 ml of $H_2O$ and precipitated, while still warm, into 14 l. of rapidly stirred isopropyl alcohol. The product, polyvinylamine hydrochloride, was filtered, washed with isopropyl alcohol (6 l.), and dried in vacuo to afford 415 g of an off-white powdery solid.

A 1-l. flask was fitted with an overhead stirrer, a 100-ml dropping funnel containing 8 N NaOH, a pH probe, and a gas inlet tube. The vessel was charged with 14.0 g (176 mmol) of the poly(vinylamine hydrochloride), 140 ml of $H_2O$, 15 ml of 8 N NaOH, and 70 ml of THF. With vigorous stirring, 15.1 g (64.6 mmol) of powdered p-acetamidobenzenesulfonyl chloride was added and the pH was maintained at 9–10 by base addition as necessary for 5 min. A second portion of the sulfonyl chloride (15.1 g) was then added followed by 70 ml of THF. After an additional 15 minutes at pH 9–10, a third equal portion of the sulfonyl chloride was added followed by 70 ml of THF and the pH was maintained at 10-11 until no further reaction was observed (stable pH, 60 min).

The flask was equipped for vacuum distillation and the THF was removed (35° C. (20 mm)). Schotten-Baumann product 1 precipitated as an easily filterable, light-tan, brittle solid. The yield was 41.7 g (99%) after thorough water washing and drying.

By varying polymerization reaction conditions such as temperature and cosolvent, the molecular weight of the polymer can be varied.

A. Hydrolysis.

A 100-ml, 3-neck flask, equipped with overhead stirrer and oil bath, was charged with 7.20 g (30.0 mmol) of polymer 1 (prepared as shown in the above Precursor Preparation on poly(N-vinylacetamide) of average molecular weight, as determined by GPC comparison with polystyrene standards, $M_p{}^{ps}$ 1.2×10$^5$), 60 ml of H$_2$O and 15.8 ml (190 mmol) of 12 N HCl. The mixture was stirred vigorously at reflux for 6 hours to effect hydrolysis.

B. Diazotization and Coupling.

A 500-ml, one-neck, round-bottom flask, equipped with magnetic stir bar and ice bath, was charged with 300 ml of H$_2$O and the above crude hydrolysis solution. The solution was vigorously stirred at room temperature and treated in one portion with 7.20 ml (36.0 mmol) of 5 N NaNO$_2$. The clear polydiazonium salt solution was immediately cooled in an ice-bath, stirred for 5 minutes, and employed for coupling.

A 4-liter beaker was fitted with overhead stirrer, pH probe, thermometer, 250-ml dropping funnel filled with 2.5 N NaOH. The beaker was charged with 2500 ml of H$_2$O and 104 g (150 mmol) of Acid Blue 92 (Eastman), and stirring (but not polymer introduction) was begun. The dark violet solution (apparently homogeneous, pH 8.9) was treated with 20 ml (160 mmol) of 8 N NaOH (pH to 13.4, solution brown), and the introduction of diazonium salt was begun.

The addition was conducted over 30 minutes with the pH maintained at 13.0-13.5 by the addition of 60 ml (150 mmol) of 2.5 N NaOH. No cooling was employed during the coupling and the final pH was 13.0 and the final volume was 3500 ml.

C. Recovery.

The brownish black solution was stirred one hour at ambient temperature, passed through a coarse-frit glass filter, and ultrafiltered with a model H1P100 cartridge (molecular weight 100,000 cutoff, Amicon Corporation, Lexington, Mass.), until the product was free of low molecular-weight contaminants. The solution was concentrated to a volume of 250 ml and freeze dried to provide 15.2 g (56.0% of theory) of 5. A small sample was submitted for elemental analysis. The N/S ratio (mequiv/g basis) was 1.48 (1.50 in theory).

D. Use.

This material as its neutral aqueous solution is applied to paper. It has a deep black color. It adheres well to bond paper, being essentially fast.

EXAMPLE II

A polymeric black colorant based on Poly(N-methyl-vinylamine) is prepared as follows:

CH$_3$NHCH$_2$CH$_2$OH →

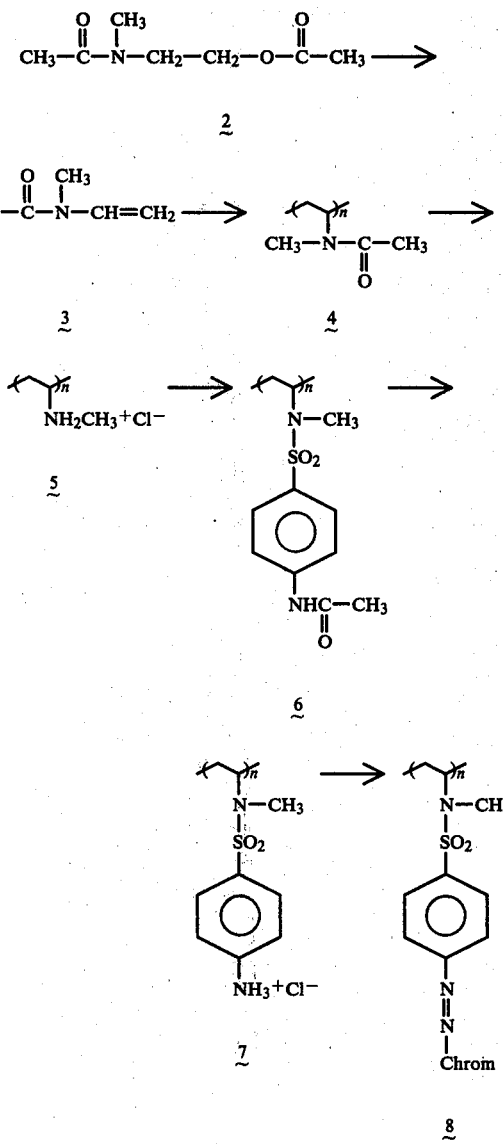

A. Preparation of 2.

N-Methylaminoethanol (250 g, 3.33 mol) is added dropwise over 60 minutes to acetic anhydride (691 g, 6.77 mol) maintained at 115°-120° C. The product is isolated by vacuum distillation (bp 95°-98° C./0.1 mm) in 93% yield as a colorless oil.

B. N-Methyl-N-vinylacetamide (3).

The product of step A is pyrolyzed by passing 642 g (4.04 mol) at a rate of 1.17 g/min through a Pyrex helices-packed quartz tube (3.5 cm diameter, 40 cm length) maintained at 480° C. A 400 ml/minute argon flow is employed. The crude pyrolyzate (629 g of dark orange oil) is distilled to afford 119 g (1.20 mol, 29.8% yield) of 3 (bp 72° C./20 mm).

C. Poly(N-methyl-N-vinylacetamide) (4).

A 2-liter, 3-neck flask, equipped with overhead stirrer, reflux condenser topped with an Argon inlet, and internal thermometer, is charged with 99.0 g (1.00 mol) of distilled N-methyl-N-vinylacetamide, 3.28 g (0.02 mol) of AIBN, and 900 ml of thoroughly degassed H$_2$O. The flask is thoroughly purged with argon and held in a bath maintained at 65° C. for 24 hours. A TLC (SiO$_2$, ethyl acetate) shows no monomer (R$_f$ 0.47) remaining.

A 4.0-ml sample is removed for analysis, while the bulk is directly employed in part D. The sample is determined by gel permeation chromatography techniques to possess a molecular weight of $1.6 \times 10^5$. Anal. Calcd for (C$_5$H$_9$NO)$_n$: C, 60.54; H, 9.15; N, 14.12. Found: C, 59.96; H, 9.49; N, 13.95.

D. Poly(N-methylvinylamine hydrochloride) (5).

The reaction mixture from part C is treated with 208 ml (2.50 mol) of 12 N HCl, placed in a teflon-lined, stirred autoclave, and heated at 125° C. for 72 hours. The crude product is cooled, evaporated to a volume of approximately 300 ml, and precipitated into 15 liters of well-stirred iso-propyl alcohol. The product is filtered, washed with 2 liters of iso-propyl alcohol, and dried (50° C./0.1 mm/48 hours). The yield is 86.2 g of granular solid possessing a nitrogen content of 10.43 mequiv/g by elemental analysis. Titration provides an amine value of 10.5 mequiv/g, indicating that hydrolysis is complete. The yield for polymerization/hydrolysis, based on nitrogen recovery, is 90.0%.

E. Schotten-Baumann Reaction.

A 1000-ml, 3-neck flask, equipped with overhead stirrer, pH probe, and 125-ml dropping funnel filled with 8 N NaOH, is charged with 21.1 g (220 mequiv of amine) of 5 and 300 ml of H$_2$O. The flask is flushed with argon and stirred until solution is complete. The solution is then treated with 22.5 ml (180 mmol) of 8 N NaOH (pH 10.0) and 150 ml of 2-methoxyethanol.

The N-acetylsulfanilyl chloride (64.5 g, 276 mmol) is then added in three equal portions of 21.5 g. The second and third additions are accompanied by 150 ml of 2-methoxyethanol.

The second addition takes place 5 minutes after the first, with the third addition taking place 15 minutes after the second. During the reaction period the pH is maintained at 9-10 by the addition of 8 N NaOH as necessary. After the final sulfonyl chloride addition, the pH is maintained at 9-10 for 30 minutes, and then raised to 10.5-11.0 and held for 1.5 hours. At the end of the reaction the pH is stable. The amount of 8 N NaOH employed during the Schotten-Baumann reaction is 47.0 ml (376 mmol).

The reaction mixture is added dropwise to 18 liters of well-stirred H$_2$O and 6 is isolated by filtration, washed thoroughly with H$_2$O, and dried (50°/0.1 mm/48 hours). The yield is 50.5 g (94.4% of theory). Elemental analysis provides a sulfur content of 3.78 mequiv/g and an N/S ratio (mequiv/g basis) of 2.06 (2.00 in theory).

F. Preparation of Polysulfanilamide 7.

A 2-liter, 3-neck flask, equipped with oil bath, overhead stirrer, and reflux condenser, is charged with 50.5 g of 6 (191 mequiv of sulfur), 846 ml of H$_2$O, and 95.5 ml (114 g, 1.15 mol) of 12 N HCl. The initial polymer concentration in this mixture is 5.0 wt%.

With overhead stirring, the bath temperature is raised to 125° C. (gentle reflux) and held for 18 hours. The solution of 7 is allowed to cool to room temperature, passed through a coarse-frit funnel, and directly employed in step G.

G. Diazotization and Coupling.

The solution from step F (964 g total weight) is placed in a 3-liter, 3-neck flask equipped with an overhead stirrer. The polymer solution is diluted with 1500 ml of H$_2$O to provide an overall polymer concentration of approximately 2 wt %.

19.5 g (229 mmol) of KNO$_2$ is dissolved in 8.0 ml of H$_2$O by briefly stirring. The solution of 7 is stirred at a moderate rate as the KNO$_2$ is added in one portion at room temperature. The perfectly clear polymeric diazonium salt solution that is produced is immediately immersed in an ice bath and stirred. A positive KI-starch test is obtained.

A plastic bucket (capacity ~10 liters), fitted with overhead stirrer, thermometer, pH probe, and 250 ml dropping funnel filled with 8 N KOH, is charged with 418 g (600 mmol) of Acid Blue 92, 3000 ml of H$_2$O, and 80 ml (640 mmol) of 8 N KOH. The mixture is stirred until solution is complete (<5 minutes).

The Acid Blue 92 solution (pH 13.3) is cooled to 15° C. by the addition of a small amount of ice and the diazonium salt solution (held in the ice bath) is added at a steady rate via peristaltic pump over 20 minutes. During the coupling the pH is maintained at 13.1-13.3 by the dropwise addition of 8 N KOH (170 ml, 1360 mmol). The final volume of the coupling solution is 7.0 liters, and the temperature rises to 17° C.

The dark solution is diluted to 18 liters with H$_2$O, passed through a coarse-frit filter, concentrated by ultrafiltration with a model H1P10 cartridge (molecular weight 10,000 cutoff, Amicon Corp., Lexington, Mass.), and then ultrafiltered for 6 × 4-liter diavolumes with the same cartridge.

The solution is concentrated to 1500 ml and freeze dried to provide 136.9 g (78.1% of theory) of black polymer 8. A small sample is dried (50° C./0.1 mm/8 hours) and submitted for elemental analysis. The N/S ratio (mequiv/g basis) is 1.46 (1.50 in theory).

EXAMPLE III

A black polymeric dye based on polystyrene is prepared as follows:

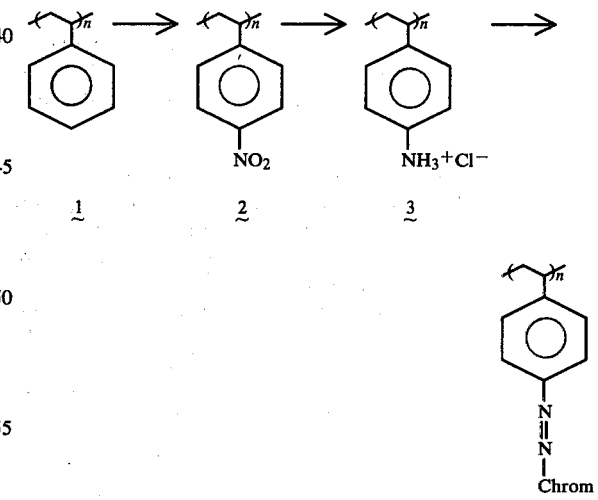

A. Preparation of 100% Nitric Acid.

Pure HNO$_3$ is prepared following the procedure of P. Liang, "Organic Syntheses," Col. Vol. III, E. C. Horning, Ed., John Wiley and Sons, New York, N.Y., 1955, pp. 803–5. A 500-ml, one-neck flask is charged with 150 ml of 96% H$_2$SO$_4$ and 150 ml of 90% HNO$_3$ (J. T. Baker cat. no. 9624), and rigged for distillation under argon.

There is obtained 131.5 g (2.09 mol) of HNO₃ (bp 79°–81° C.) as a light yellow liquid. The acid is stored in the freezer prior to step B.

B. Nitration of Styrene.

A 250-ml, 3-neck flask, equipped with overhead stirrer, low-temperature thermometer, argon inlet, and cooling bath, is charged with 131.5 g (2.09 mol) of HNO₃ and cooled to an internal temperature of −30° C. Finely powdered polystyrene (21.0 g, 0.202 mol, molecular weight determined to be $1.3 \times 10^5$ by gel permeation chromatography techniques) from Cellomer Associates (Webster, NY) is added portionwise over 2 hours while maintaining the temperature at −30° C. After stirring for an additional hour at this temperature, the viscous mass is allowed to slowly warm to ambient temperature and stir for 24 hours.

Crude 2 is isolated by direct precipitation of the reaction mixture into 3 liters of ice water. The product is filtered, washed with H₂O, and thoroughly ground in a commercial blender with H₂O. The product is again filtered, washed with H₂O and then acetone, and dried (50°/0.1 mm/24 hours). The yield of off-white solid is 33.1 g (110% of theory): Anal. Calcd. for $(C_8H_7NO_2)_n$: C, 64.43; H, 4.70; N, 9.39. Found: C, 63.72; H, 4.49; N, 9.83.

C. Preparation of p-Aminopolystyrene (3).

A 100-ml, 2-neck flask, equipped with overhead stirrer and argon inlet, and rigged for distillation, is charged with 2.00 g (13.4 mmol) of 2 and 50 ml of 97% phenylhydrazine (Aldrich Chemical Co., Milwaukee, Wis.). With vigorous stirring, the mixture is heated to 200° C. (bath) and there maintained for 3 hours. During this period the polymer dissolves, and approximately 5 ml of low boiling liquid is removed by distillation.

The reaction mixture is cooled to room temperature and directly precipitated into 2 liters of diethyl ether. The p-aminopolystyrene obtained is filtered and immediately dissolved in 500 ml of 0.5 N HCl. This solution is evaporated and the product dried (25° C./0.1 mm/18 hours) to give 2.00 g (12.9 mmol, 96.2% yield) of p-aminopolystyrene hydrochloride (3). Anal. Calcd for $(C_8H_{10}NCl)_n$: C, 61.74, H, 6.43; N, 9.00; Cl, 22.83. Found: C, 62.00; H, 6.61; N, 8.81; Cl, 22.56.

D. Diazotization and Coupling.

A 5-liter, 3-neck flask, equipped with overhead stirrer and cooling bath, is charged with 75.0 g (0.482 mol) of 3, 101 ml (120 g, 1.21 mol) of 12 N HCl, and 3555 ml of H₂O. The mixture is stirred until solution is complete, cooled to 10° C. (internal), and treated (rapidly in one portion) with 116 ml (0.580 mol) of 5 N NaNO₂. The perfectly clear polymeric diazonium salt solution that is produced is immediately cooled to 0° C. with continued stirring. A positive KI-starch test is obtained.

A 25-liter battery jar, equipped with overhead stirrer, thermometer, pH probe, and 500-ml dropping funnel filled with 8 N NaOH is charged with 0.723 mol of Acid Blue 92, 5000 ml of H₂O, and 100 ml (0.80 mol) of 8 N NaOH. The mixture is stirred until solution is complete (pH 13.40), and cooled to 8° C. by the addition of ice.

The polymeric diazonium salt solution (maintained at 0° C.) is added to the Acid Blue 92 solution by peristaltic pump over 30 minutes. During this period, the pH is maintained at 13.0–13.5 by the addition of 8 N NaOH (123 ml, 0.982 mol) and the temperature is controlled at 15°–20° C. by the addition of ice.

The solution (approximately 15 liters in volume) is passed through a coarse-frit filter, concentrated by ultrafiltration with an H1P10 cartridge, and ultrafiltered for 6×10-liter diavolumes with the same cartridge.

The solution is concentrated to 5000 ml and freeze dried to provide 308.3 g (77.5% by theory) of 4 as a black solid. A small sample is dried (50° C./0.1 mm/18 hours) and submitted for elemental analysis. This provides a nitrogen content of 6.05 mequiv/g, a sulfur content of 3.63 mequiv/g, and a C/N ratio of 6.80 (6.80 in theory). Anal. Calcd. for $(C_{34}H_{22}N_5O_{10}S_3N_{93})_n$: C, 49.46; H, 2.69; N, 8.48; S, 11.65. Found: C, 48.86; H, 3.01; N, 8.32; S, 11.49.

EXAMPLE IV

A polymer in black colorant based on poly(ethyleneimine) (PEI) is prepared as follows:

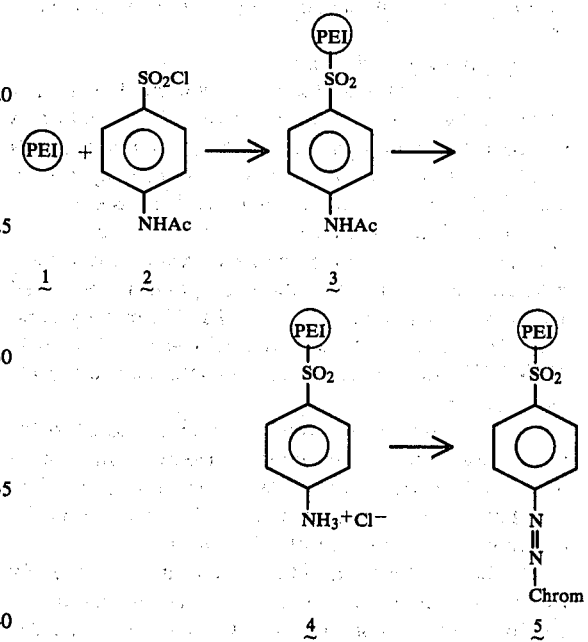

The poly(ethyleneimine) used in this example is obtained from Polysciences, Inc., Warrington, Pennsylvania (lot #2632). The sample is labeled as a 33 wt % aqueous solution of molecular weight $4.0$–$6.0 \times 10^4$ polymer. Elemental analysis of the solution provides a value of 8.07 mequiv N/g, and titration of the solution shows 5.29 mequiv titratable amine/g.

A. Schotten-Baumann Reaction.

A 1000-ml, 3-neck flask, equipped with overhead stirrer, pH probe, and 125-ml dropping funnel filled with 8 N NaOH, is charged with 23.4 g of poly(ethyleneimine) solution, 300 ml of H₂O, and 150 ml of THF. Stirring is begun under argon. The solution is clear and possesses a pH of 10.

The solution is treated with 18.4 g (78.7 mmol) of N-acetylsulfanilyl chloride (2), stirred for 5 minutes, and the pH maintained at 9–10 by the addition of 8 N NaOH (12 ml, 96 mmol). The solution is then treated with a second equal portion of sulfonyl chloride 2 and 150 ml of THF while maintaining the pH at 9–10 by the addition of 8 N NaOH (12 ml, 96 mmol) over 15 minutes.

The mixture, now an emulsion, is treated with a third equal portion of 2 and 150 ml of THF. The pH is maintained at 10–11 by the addition of 8 N NaOH (15 ml, 120 mmol) over 60 minutes.

The emulsion is transferred to a 2-liter, one-neck flask and subjected to rotary evaporation. After all the THF is evaporated, polymer 3 is obtained as a granular off-white solid. The product is broken up, filtered, washed well with H₂O, and dried (50° C./0.1 mm/5 hours). The yield is 37.0 g, and elemental analysis (C, 50,85; H, 5.72; N, 12.04; S, 12.09) provides a sulfur content of 3.77 mequiv/g.

B. Hydrolysis.

A 500-ml, 3-neck flask, equipped with overhead stirrer, oil bath, and reflux condenser, is charged with 5.00 g of 3 as prepared above (18.9 mequiv of sulfur), 9.43 ml (113 mmol) of 12 N HCl, and 234 ml of H₂O. With stirring, the mixture is refluxed for 10 hours, cooled, filtered (coarse-frit funnel), and directly employed in step C.

C. Diazotization and Coupling.

The solution of 4 is placed in a 500-ml, 3-neck flask equipped with an overhead stirrer. The solution is stirred at a moderate rate as 4.70 ml (23.5 mmol) of 5 N NaNO₂ is added in one portion at room temperature. The clear solution is cooled in an ice bath as stirring is continued. A positive KI-starch test is obtained.

A 2-liter beaker, fitted with overhead stirrer, thermometer, pH probe, and 50-ml dropping funnel filled with 8 N NaOH, is charged with 42 g (60 mmol) of Acid Blue 92, 400 ml of H₂O, and 8 ml (64 mmol) of 8 N NaOH. The mixture is stirred until solution is complete (<5 minutes).

The Acid Blue 92 solution (pH 13.6) is cooled to 15° C. by the addition of ice, and the diazonium salt solution is added dropwise over 25 minutes via a dropping funnel. The pH is maintained at 13.0-13.5 throughout the coupling by the addition of 8 N NaOH.

The dark solution is diluted to 2 liters with H₂O, passed through a coarse-frit filter, concentrated by ultrafiltration with a model H1P100 cartridge (molecular weight 10,000 cut-off, Amicon Corp., Lexington, Mass.), and then ultrafiltered for six×400 ml diavolumes with the same cartridge.

The solution is concentration to 150 ml and freeze dried to provide black polymer 5.

We claim:

1. A water-soluble polymeric black colorant which comprises an organic polymer backbone comprising a plurality of aromatic rings and a plurality of units of 8-(4-anilino-5-sulfo-1-naphthlylazo)-1-naphthol-3,6-disulfonic acid or a cation salt thereof covalently bonded to said backbone via azo groups that link a backbone aromatic carbon and the 2-position carbon of said acid or cation salt units.

2. A black colorant of claim 1 wherein said polymeric compound is a homopolymer.

3. A black colorant of claim 1 wherein said polymeric compound is a copolymer.

4. A black colorant of claim 1 wherein said aromatic rings are pendant from an organic chain which links them together into the polymer backbone.

5. A black colorant of claim 1 wherein said aromatic rings are present as integral structural units in the organic backbone chain.

6. A black colorant of claim 4 having recurring units of the structure

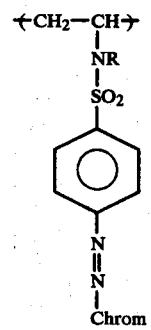

wherein R is hydrogen or a lower alkyl group, Chrom is

![structure](MO₃S, OH, N=N, NH, SO₃M, SO₃M)

and M is a cation.

7. A black colorant of claim 6 wherein R is hydrogen.

8. The black colorant of claim 6 wherein R is a methyl group.

9. The black colorant of claim 7 wherein M is sodium cation.

10. The black colorant of claim 7 wherein M is potassium cation.

11. A black colorant of claim 4 wherein said backbone is polystyrene and said compound comprises recurring structural units of the formula ![structure]

wherein Chrom is

![structure](MO₃S, OH, N=N, NH, SO₃M, SO₃M)

and M is a cation.

12. The black colorant of claim 11 wherein M is selected from the group consisting of sodium and potassium cations.

13. A black colorant of claim 4 wherein the organic chain derived from poly(ethyleneimine) thereby comprising recurring structural units of the formula

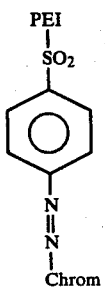

wherein PEI is poly(ethyleneimine) linked to the SO₂'s through amine nitrogens and Chrom is

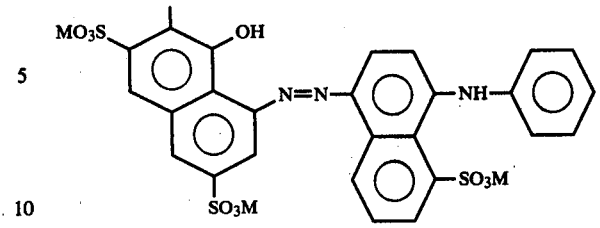

14. A black colorant of claim 13 wherein M is selected from the group of sodium and potassium cations.

15. A black polymeric dye solution comprising from 1000 ppm to 20% by weight of the colorant of claim 1 in a water-based solvent system.

16. A solution of claim 15 additionally comprising an additional polymeric colorant.

17. A printed cellulosic web having deposited thereon the colorant of claim 1.

* * * * *